US 6,742,942 B2

(12) United States Patent
Hering et al.

(10) Patent No.: US 6,742,942 B2
(45) Date of Patent: Jun. 1, 2004

(54) FIRE-RATED DOME HOUSING FOR SECURITY CAMERAS

(75) Inventors: Steven L. Hering, Corvallis, OR (US); Scott A. Jolma, Corvallis, OR (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/172,571

(22) Filed: Jun. 13, 2002

(65) Prior Publication Data

US 2003/0231881 A1 Dec. 18, 2003

(51) Int. Cl.[7] ............................................. G03B 17/00
(52) U.S. Cl. ...................... 396/427; 348/143; 348/150
(58) Field of Search ........................ 348/143, 150, 348/151; 396/427

(56) References Cited

U.S. PATENT DOCUMENTS

| 3,130,949 A | * | 4/1964 | Erhardt et al. ............... 248/343 |
| 6,234,691 B1 | * | 5/2001 | Jones et al. .................. 396/427 |
| 6,268,882 B1 | * | 7/2001 | Elberbaum ................... 348/151 |

OTHER PUBLICATIONS

Observadome Two–Piece Housing O124, Videolarm catalog, Decatur, GA, undated, printed Jan. 22, 2002 from www.videolarm.com, p. 50.
Deltavision MD10SR Surface Mount Dome, Automation & Security, Inc., 2000, printed Jan. 22, 2002 from www.asi-.com.ph/cctv_delta_camera_MD10SR.html, pp. 1 and 2.
Firepro B240 Kaowool Fibre Wool Blanket, Firepro, New Zealand, undated, printed Jan. 22, 2002 from www.firepro-.co.nz/datasheets/02–025B240%20Kaowool.htm, pp. 1 and 2.
NEI Dome Enclosures, URL www.neiparts.com/security/enclosredome.php3, undated, printed Jan. 22, 2002, pp. 1–4.
Minipan Recessed Housing MP121/141, Videolarm catalog, Decatur, GA, undated, printed Jan. 22, 2002 from www.videolarm.com, pp. 44 and 45.
Plexi–View: Drop–In Panels for Grid Ceilings, Security Mirrors–dot–com, Hermitage, TN, 2000, printed from www.security–mirrors.com/drop–in_panels.htm, pp. 1 and 2.

* cited by examiner

Primary Examiner—David M. Gray
(74) Attorney, Agent, or Firm—Stoel Rives LLP

(57) ABSTRACT

A preferred fire-rated dome housing assembly (10) is mountable in a space (12) formed between a ceiling (14) and a false ceiling (16) and having a height (20) as little as 8.9 cm. The housing assembly includes a housing (22) that is mountable through a hole (24) in the false ceiling, and is protected from heat by a thermal insulation blanket (32). Support straps (34) are attached to a ceiling ring (36) that surrounds the hole for securing the housing assembly to false ceiling supporting members (18). A spacing collar (50) is fastened to the ceiling ring by threaded spacers (52) that extend below the false ceiling. The housing protrudes below the false ceiling and includes a mounting flange (48) that is fastened to the spacing collar. A dome (62) is secured to the mounting flange. The housing assembly preferably encloses a video camera (102).

23 Claims, 3 Drawing Sheets

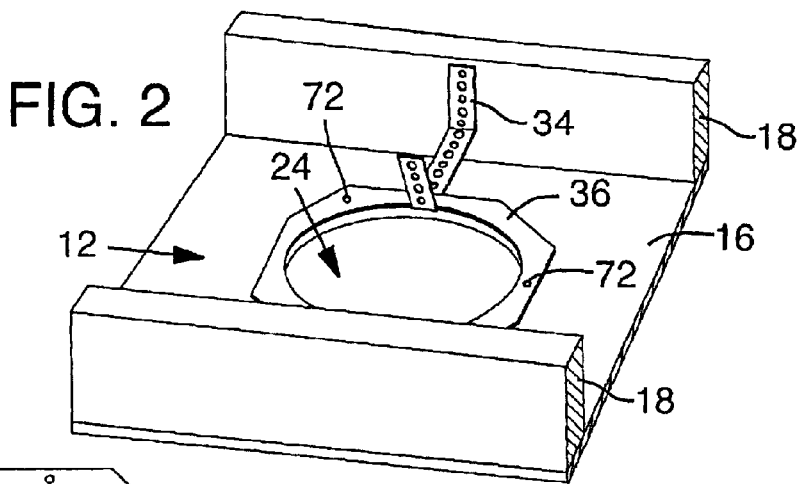
FIG. 2
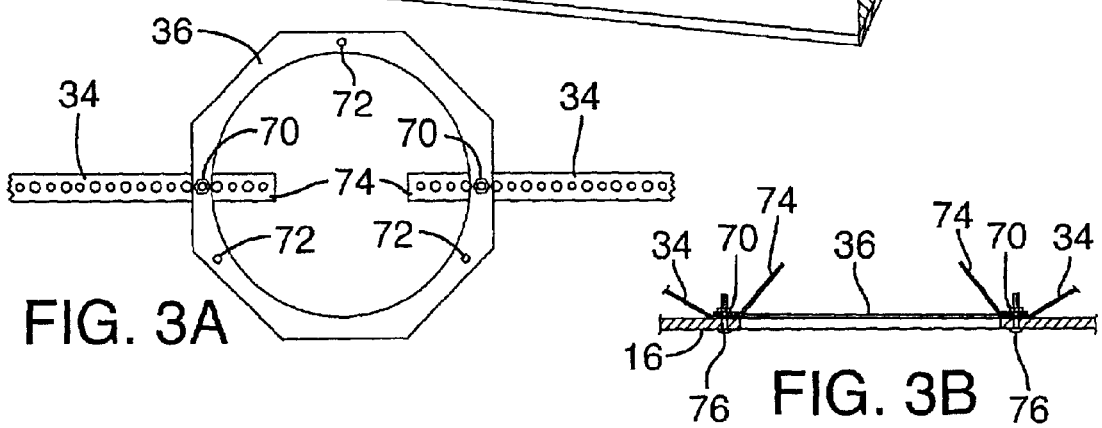
FIG. 3A
FIG. 3B
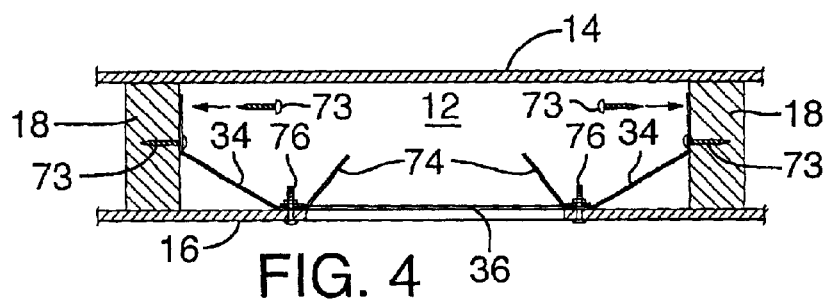
FIG. 4
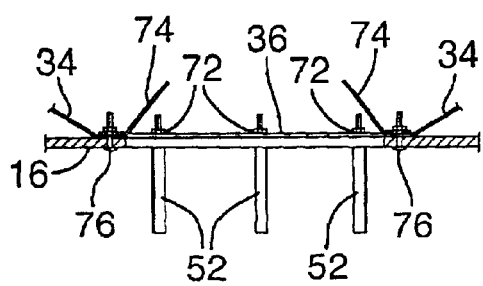
FIG. 5A
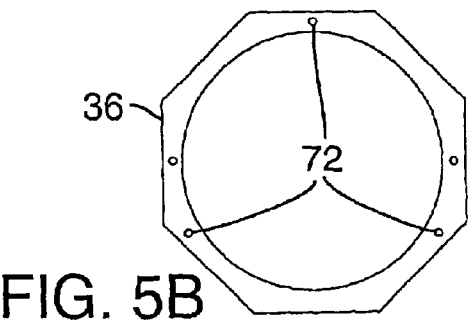
FIG. 5B

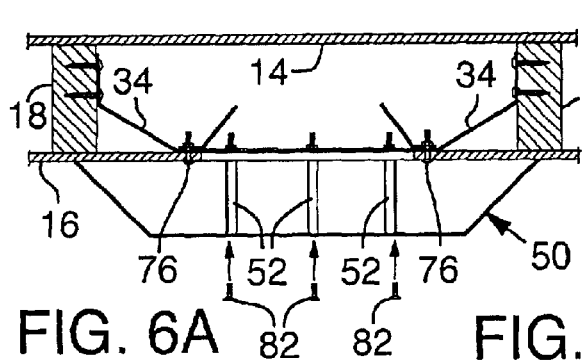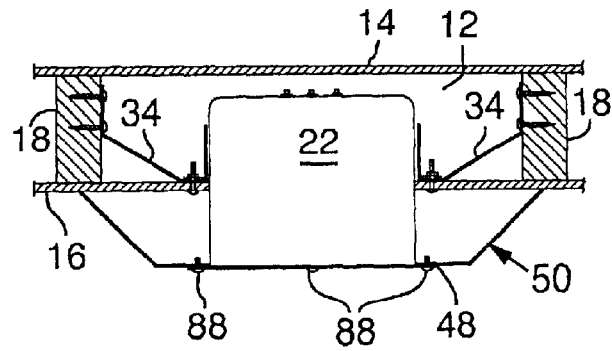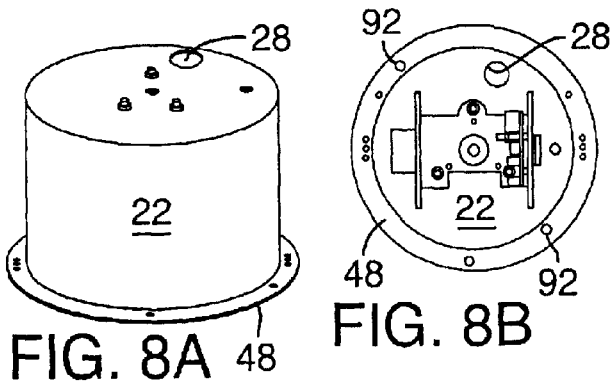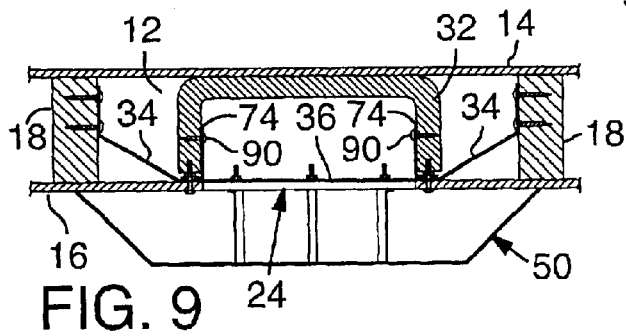

FIRE-RATED DOME HOUSING FOR SECURITY CAMERAS

RELATED APPLICATION(S)

Not Applicable

FEDERALLY SPONSORED RESEARCH OR DEVELOPMENT

Not Applicable

TECHNICAL FIELD

This invention relates to security systems, and more particularly to a fire-rated dome housing assembly for mounting a pivotable video security camera.

BACKGROUND OF THE INVENTION

Dome housings for mounting video cameras employed in security systems typically include a metal housing portion and a plastic dome portion in which the housing portion is mountable through a hole in a ceiling and the dome portion is attached to the housing portion. In many installations, the ceiling is a dropped or false ceiling that is spaced apart from a structural ceiling by joists or other supporting members. The enclosed volumetric space between the structural ceiling, dropped ceiling, and adjacent supporting members often functions as an air plenum for a heating and air conditioning system.

However, there are disadvantages to currently available dome housings. The volumetric space or plenum height between the structural ceiling and the false ceiling can be as little as 8.9 cm (3.5 inch), which is less than the height of many metal housing portions. The dome housings typically mount by snap clips to the hole in the ceiling material, which is typically sheet rock or insulation panel material. At high temperatures, the combined mass of the dome housing and its enclosed device can cause a collapse of the false ceiling, thereby compromising the plenum air flow and the ceiling fire-rating.

Prior workers have addressed the ceiling collapse problem by providing metal straps for securing the housing to the joists or to the structural ceiling. For example, the model MP121/141 Recessed Housing manufactured by Videolarm of Decatur, Ga. meets fire codes and includes metal straps for securing the housing to joists. However, the MP121/141 housing is 17.9 cm (7.05 inches) high, which is too tall to fit in many air plenums.

What is needed, therefore, is a dome housing capable of being mounted in an 8.9 cm (3.5 inch) or higher volumetric space or plenum, forestalling ceiling collapse during a fire, and maintaining a ceiling fire rating.

SUMMARY OF THE INVENTION

An object of this invention is, therefore, to provide a dome housing apparatus that can be mounted in an 8.9 cm (3.5 inch) or higher volumetric space or plenum.

Another object of this invention is to provide a dome housing apparatus that during a fire forestalls ceiling collapse.

A further object of this invention is to provide a dome housing apparatus that during a fire maintains the ceiling fire rating.

A preferred embodiment of a fire-rated dome housing assembly of this invention is mountable in a volumetric space formed between a structural ceiling and a false ceiling that is spaced apart from the structural ceiling by joists or supporting members. The false ceiling may be spaced apart from the structural ceiling by as little as about 8.9 cm (3.5 inch).

The housing assembly includes a housing that is mountable through a hole in the false ceiling, and is protected from heat by a thermal insulation blanket that encloses the portion of the housing that extends into the plenum. Support straps are attached to a ceiling ring that surrounds the hole for securing the housing assembly to the supporting members. The support straps pass between the ceiling ring and the false ceiling, and extend upward for attachment to the supporting members. The housing includes a lower portion that protrudes below the false ceiling and includes a mounting flange at its lower margin. Because the lower portion protrudes below the false ceiling, a spacing collar is fastened to the ceiling ring by threaded spacers that extend the protrusion distance below the false ceiling. The spacing collar is decorative and protects the housing from flame and heat.

A hemispherical LEXAN plastic dome-shaped cover piece (hereafter "dome") is suspended by a trim ring that is secured to the mounting flange with tamper-resistant screws. The housing preferably encloses at least one electronic device, such as a video camera.

The housing assembly of this invention is advantageous because it meets the standard small-scale horizontal fire endurance test referred to as ASTM E119, mounts in a restricted height volumetric space or plenum, prevents false ceiling collapse in the event of a fire, and maintains a one-hour ceiling fire rating.

Additional objects and advantages of this invention will be apparent from the following detailed description of a preferred embodiment thereof that proceeds with reference to the accompanying drawings.

BRIEF DESCRIPTION OF THE DRAWINGS

FIG. 2 is an oblique pictorial view showing a ceiling ring and support strap of this invention mounted in the ceiling air plenum of FIG. 1.

FIGS. 3A and 3B are top and sectional side views showing the ceiling ring and support straps of this invention as prepared for installation in the ceiling air plenum of FIG. 1.

FIG. 4 is a sectional side view showing the ceiling ring and support straps of this invention as shaped and fastened into the ceiling air plenum of FIG. 1.

FIGS. 5A and 5B are sectional side and plan views showing the ceiling ring of this invention with threaded spacers protruding below the ceiling air plenum of FIG. 1.

FIGS. 6A and 6B are sectional side and plan views showing a spacing collar secured to the threaded spacers of FIG. 5.

FIGS. 7A and 7B are sectional side and plan views showing a housing secured to the spacing collar of FIGS. 6A and 6B and protruding through a false ceiling into the ceiling air plenum of FIG. 1.

FIGS. 8A and 8B are isometric and bottom plan views showing the housing of FIGS. 7A and 7B.

FIG. 9 is a sectional side view showing a thermal insulation blanket of this invention secured within a ceiling air plenum by the support straps of FIGS. 3A, 3B, and 4.

FIG. 10 is a frontal isometric view showing the dome housing assembly of this invention with the dome in a detached position to reveal a video camera mounted within the housing.

DETAILED DESCRIPTION OF PREFERRED EMBODIMENT

Figure 1:
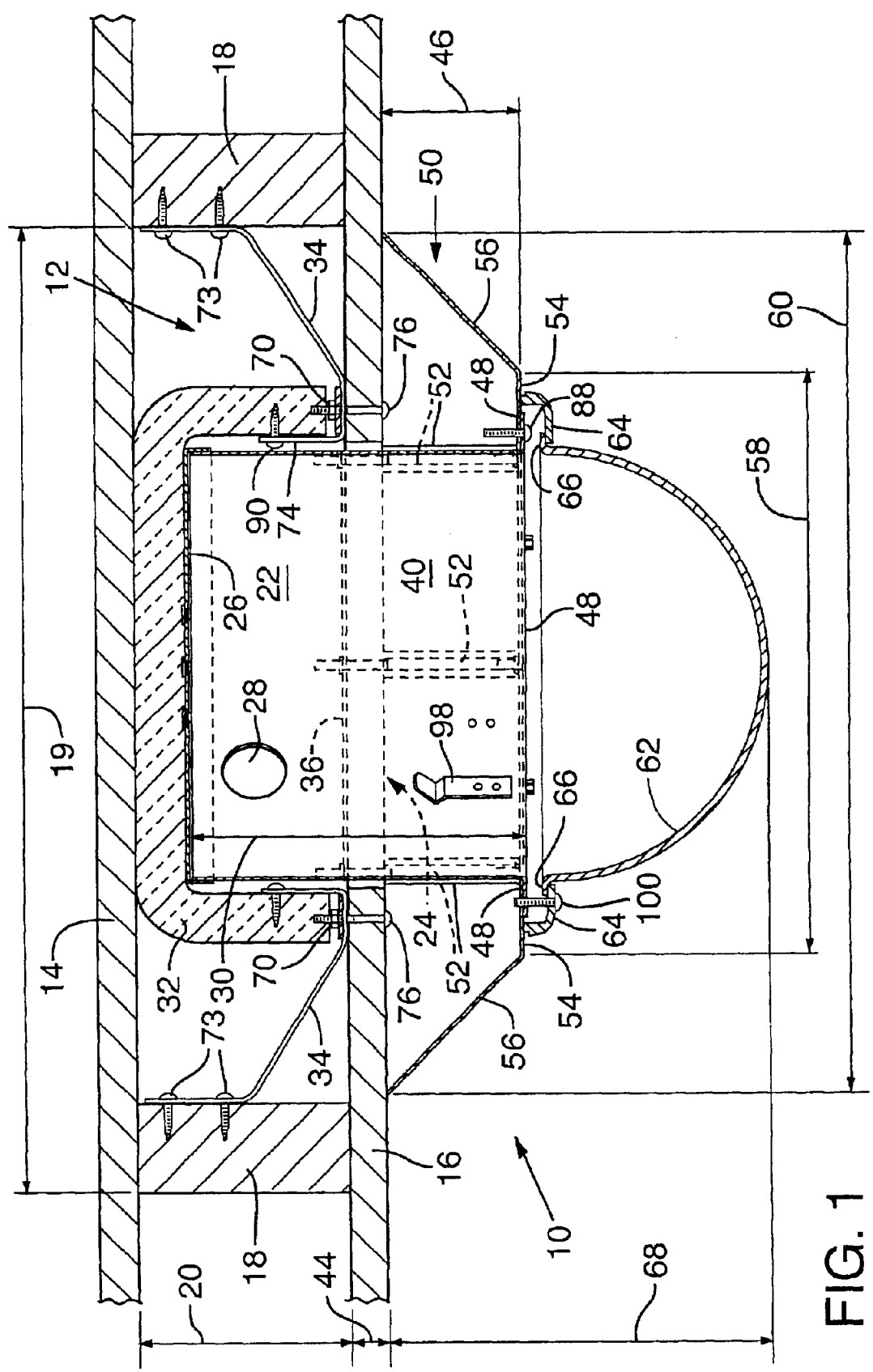
FIG. 1 is a sectional side elevation view showing a fire-rated dome housing assembly of this invention mounted in a ceiling air plenum.

FIG. 1 shows a fire-rated dome housing assembly 10 of this invention, which is mountable in a volumetric space or plenum 12 formed between a structural ceiling 14 and a dropped or false ceiling 16 that is spaced apart from structural ceiling 14 by joists or supporting members 18. In many applications, structural ceiling 14 is actually a fire stop or fire barrier, but will be referred to herein as structural ceiling 14. False ceiling 16 is spaced apart from structural ceiling 14 by a distance 20 of at least about 8.9 cm (3.5 inch). Skilled workers will understand that supporting members 18 may be metal or wood joists or merely wires suspending a support grid into which ceiling panels are inserted to form false ceiling 16. Supporting members 18 are typically spaced apart a center-to-center distance 19 of about 40.64 cm (16.0 inches). In such a suspended false ceiling, plenum 12 encompasses substantially the entire volumetric space between structural ceiling 14 and false ceiling 16.

Housing assembly 10 includes a housing 22 that is mountable through a hole 24 in false ceiling 16. Housing 22 is preferably a 20-gauge cylindrical steel can having an enclosed top surface 26, at least one wiring knockout 28, and a height 30 of about 13.77 cm (5.42 inches).

Housing assembly 10 is protected from heat in plenum 12 by a thermal insulation blanket 32 that encloses the portion of housing 22 that extends into plenum 12. Thermal insulation blanket 32 is preferably formed from a 2.54 cm (1 inch) thick insulating blanket material, such as KAOWOOL ceramic fibre insulation material, which is available from various commercial suppliers including Thermal Ceramics of Augusta, Ga. KAOWOOL has a 1,250° C. nominal rating for up to four hours of fire protection.

At least two support straps 34 are attached to a ceiling ring 36 that surrounds hole 24 for securing housing assembly 10 to structural ceiling 14 or preferably supporting members 18. Support straps 34 are preferably bent to pass between ceiling ring 36 and false ceiling 16, and then extend in a generally upward direction for conventional attachment to supporting members 18 or structural ceiling 14. Support straps 34 are made from 20-gauge galvanized steel tape that is about 1.91 cm (0.75 inch) wide by 20.3 cm (8 inches) long and includes 0.7 cm (0.27 inch) diameter holes spaced apart on 1.27 cm (0.5 inch) centers. Commercially available "plumbers tape" is a suitable material for support straps 34.

Housing 22 includes a lower portion 40 that protrudes below false ceiling 16. Assuming false ceiling 16 has a standard thickness 44 of about 1.59 cm (0.625 inch), then lower portion 40 protrudes below false ceiling 16 by a distance 46 of about 5.84 cm (2.3 inches), and top surface 26 of housing 22 extends 6.35 cm (2.5 inches) into plenum 12. Lower portion 40 further includes a mounting flange 48 that extends radially outward from the lower end margin of lower portion 40.

Because lower portion 40 protrudes below false ceiling 16, a spacing collar 50 is fastened to ceiling ring 36 by threaded spacers 52 that extend distance 46 below false ceiling 16. Threaded spacers 52 include male threaded ends that thread into mating threaded holes in ceiling ring 36. Threaded spacers 52 further include female threaded ends.

Spacing collar 50 includes a flat portion 54 that extends radially outward from lower rim 52 and a skirt portion 56 that slopes generally upward from the periphery of flat portion 54 and into proximity with false ceiling 16. Spacing collar 50 is secured below false ceiling 16 by flat-head screws passing through flat portion 54 and into the female threaded ends of threaded spacers 52. Flat portion 54 preferably extends a diameter 58 of about 24.45 cm (9.625 inches), and skirt portion 56 extends a diameter 60 of about 36.13 cm (14.223 inches). Spacing collar 50 not only serves decorative and spacing purposes but also protects from flame and heat incursion any margin between hole 24 and lower portion 40 of housing 22.

Housing 22 is attached to spacing collar 50 by screws passing through mounting flange 48 into threaded holes in flat portion 54.

A 17.78 cm (7.0 inch) hemispherical LEXAN plastic dome-shaped cover piece, dome 62, is suspended by a trim ring 64. Dome 62 includes a peripheral lip 66 that is supported by the opening in trim ring 64. Trim ring 64 is secured to mounting flange 48 with tamper-resistant screws. The apex of dome 62 preferably protrudes a distance 68 of about 16.77 cm (6.365 inches) below false ceiling 16.

The structure and interrelationship of the various components of housing assembly 10 will be more apparent in light of its preferred installation procedure set forth below. When installed as described in a one-hour fire-rated ceiling, housing assembly 10 meets the standard small-scale horizontal fire endurance test referred to as ASTM E119.

FIG. 2 shows ceiling ring 36 and one of straps 34 positioned for installation in false ceiling 16 and supported from supporting members 18.

Locate a position on false ceiling 16 that is centered between supporting members 18 for installing housing 22 (FIG. 1). False ceiling 16 should be able to support about 15.88 kilograms (35 pounds), which is the weight housing assembly 10 (FIG. 1).

Referring also to FIGS. 3A and 3B, use ceiling ring 36 as a template to mark on the bottom surface of false ceiling 16 a cutout for hole 24, locations for strap mounting holes 70, and locations for spacer mounting holes 72. Align ceiling ring 36 as shown in FIG. 2.

Cut hole 24 in false ceiling 16 and drill mounting holes 70 and 72 to accept No. 6-32 fasteners.

Slightly bend ceiling ring 36 and insert it through hole 24 into plenum 12. Flatten ceiling ring 36 and align it with mounting holes 70 and 72 drilled in false ceiling 16.

Referring also to FIG. 4, support straps 34 are typically cut from a roll of strap material such that each of support straps 34 is sufficiently long to secure it to supporting members 18 with two screws 73 and provide a tail 74 extending inward about 6.35 cm (2.5 inches) from ceiling ring 36. Note that the preferred ceiling strap material has alternating large and small holes punched therein. For the typical 40.6 cm (16 inch) center-to-center spacing of supporting members 18, the length of support straps 34 should be about 25.4 cm (10 inches).

Position support straps 34 between ceiling ring 36 and false ceiling 16 and align one of the small holes in each of support straps 34 with strap mounting holes 70 in false ceiling 16 and ceiling ring 36. The mounting holes 70 and 72 in ceiling ring 36 include PEM nuts for receiving No. 6-32 fasteners. Secure ceiling ring 36 and support straps 34 to false ceiling 16 with two No. 6-32 by 2-inch long machine screws 76 threaded into strap mounting holes 70 in ceiling ring 36. Secure support straps 34 to supporting members 18 with screws 73.

Referring to FIGS. 5A and 5B, insert the male threaded ends of threaded spacers 52 through mounting holes 72 in false ceiling 16 and thread them into spacer mounting holes 72 of ceiling ring 36.

Referring to FIGS. 6A and 6B, spacing collar 50 includes collar mounting holes 80 positioned to align with threaded spacers 52 and formed to accept No. 6-32 flathead fasteners. Secure spacing collar 50 to threaded spacers 52 by aligning mounting holes 80 with threaded spacers 52, inserting No. 6-32 by 9.53 mm (⅜ inch) long flathead screws 82 through spacer mounting holes 80, and tightening them into the female threaded ends of threaded spacers 52. Spacing collar 50 further includes housing mounting holes 84 that include PEM nuts for receiving No. 6-32 fasteners.

Referring to FIGS. 7A and 7B, mounting flange 48 of housing 22 includes housing mounting holes 86 formed to accept No. 6-32 flathead fasteners and positioned to align with housing mounting holes 84 in spacing collar 50. Secure housing 22 to spacing collar 50 by aligning housing mounting holes 84 and 86, inserting No. 6-32 by 9.53 mm (⅜ inch) long flathead screws 88 through housing mounting holes 86, and tightening them into housing mounting holes 84.

FIGS. 8A and 8B show housing 22 and a typical location for wiring knockout 28. Also referring to FIG. 7A, with housing 22 installed in plenum 12, the location of wiring knockout 28 can be marked on structural ceiling 14. Then housing 22 can be detached from spacing collar 50 and removed. An appropriate conduit pipe and associated wiring can now be installed according to local building codes.

Referring to FIG. 9, insert thermal insulation blanket 32 through hole 24 and into plenum 12. Center thermal insulation blanket 32 above ceiling ring 36 and shape blanket 32 to accommodate housing 22. Secure thermal insulation blanket 32 to tails 74 of support straps 34 with wood screws 90. Cut a small hole through thermal insulation blanket 32 to accommodate the wiring associated with the conduit pipe. Feed the wiring, such as video, 24-VAC, and RS422 cables, from the conduit pipe and through the small hole in thermal insulation blanket 32.

Reinstall housing 22 into plenum 12 as described with reference to FIGS. 7A and 7B. Make sure that the wiring emerging from the small hole in thermal insulation blanket 32 properly enters cabling knockout 28 and that thermal insulation blanket 32 covers the top of housing 22.

Referring to FIGS. 8B and 10, mounting flange 48 on housing 22 further includes dome mounting holes 92 that include PEM nuts for receiving No. 6-32 fasteners. Trim ring 64 on dome 62 further includes dome mounting holes 94 formed to accept No. 6-32 fasteners and positioned to align with dome mounting holes 92 in mounting flange 48.

Dome 62 further includes a safety tether cable 98, and the inside surface of housing 22 includes a safety clip 98. Before installing dome 62 on housing 22, safety tether cable 96 should be fastened to safety clip 98. Then secure dome 62 to mounting flange 48 by aligning dome mounting holes 92 and 94, inserting No. 6-32 pan head tamper-resistant screws 100 through dome mounting holes 94, and tightening them into dome mounting holes 92.

Housing assembly 10 may enclose a variety of electronic devices but preferably encloses at least one video camera 102. Depending on the application, camera 102 may have fixed or manually positional aiming orientations or may have a motor-driven aiming orientation.

Housing assembly 10 is advantageous because it is mountable in a volumetric space or plenum as small as 8.9 cm (3.5 inch) high, forestalls false ceiling collapse during a fire, and maintains the ceiling fire rating.

Skilled workers will recognize that portions of this invention may be implemented differently from the implementation described above for a preferred embodiment. For example, housing 22 may have other than a cylindrical shape. The components of housing assembly 10 may have different diameters, dimensions, and materials from those described for preferred embodiments. Dome 62 may be formed from material other than LEXAN plastic and may be a clear or tinted material. Housing 22 may be formed from a variety of fireproof materials other than steel. Housing assembly 10 preferably encloses at least one video camera, but may enclose a wide variety of devices that would benefit from ceiling mounting including a dummy decoy device visible through a clear dame or no device at all obscured by a darkly tinted dome. Of course, housing assembly 10 can be mounted in various spaces other than a plenum.

It will be obvious to those having skill in the art that many changes may be made to the details of the above-described embodiment of this invention without departing from the underlying principles thereof. The scope of this invention should, therefore, be determined only by the following claims.

We claim:

1. A fire-rated container apparatus mountable in a volumetric space formed between structural and false ceilings spaced apart from each other by supporting members, the structural and false ceilings separated by a volumetric space height and the false ceiling including a false ceiling hole that provides an access opening to the volumetric space, comprising:

a ceiling ring attachable to the false ceiling and having a ring opening that upon attachment is positioned relative to the false ceiling hole to provide access to the volumetric space;

multiple support straps each of which having a first end and a second end, the support straps at first locations nearer to the first ends being securable to the ceiling ring in angularly spaced-apart relation and the support straps at second locations nearer to the second ends being adaptable for an operative structural connection to the structural ceiling;

a housing including structural ceiling and open lower end portions and having an outer surface and a length, the length of the housing when inserted into the ring opening and set in the volumetric space exceeding the volumetric space height so that the lower end portion protrudes outwardly from the false ceiling;

a spacing collar configured to surround the lower end portion and cover the outer surface that protrudes outwardly from the false ceiling and securable to the ceiling ring to fixedly set the housing in the volumetric space; and a cover piece adapted for operative structural connection to the lower end portion to cover it.

2. The apparatus of claim 1 further comprising a thermal insulation blanket covering a sufficient amount of surface area of the structural ceiling portion of the housing set in the volumetric space to maintain a ceiling fire-rating during a fire.

3. The apparatus of claim 2 in which the thermal insulation blanket is secured in place by attachment to at least two of the multiple support straps at locations proximal to the first ends.

4. The apparatus of claim 1 in which the operative structural connection of the support straps to the structural ceiling includes fixed connections of the support straps at their second locations to the supporting members.

5. The apparatus of claim 1 in which the housing is formed as a 20-gauge cylindrical steel can having an enclosed top surface.

6. The apparatus of claim 2 in which the thermal insulation blanket is formed from a material including KAO-WOOL.

7. The apparatus of claim 1 in which the portion of the housing mountable in the volumetric space has a height of about 6.35 centimeters.

8. The apparatus of claim 1 in which the ceiling ring is secured around the false ceiling hole on a surface of the false ceiling facing the structural ceiling.

9. The apparatus of claim 1 in which the lower end portion of the housing further includes a mounting flange that attaches to the spacing collar.

10. The apparatus of claim 9 further including a trim ring attached to the mounting flange, the trim ring having a hole therein for suspending the cover piece.

11. The apparatus of claim 1 in which the cover piece is formed from a clear material or a tinted material.

12. The apparatus of claim 1 in which the cover piece is in the shape of a dome.

13. The apparatus of claim 1 in which the fire-rated container encloses at least one electronic device.

14. The apparatus of claim 13 in which the electronic device includes at least one video camera.

15. The apparatus of claim 1 in which the volumetric space includes a plenum.

16. The apparatus of claim 1 in which the fire-rated container meets a standard small-scale horizontal fire endurance test referred to as ASTM E119.

17. In a volumetric space formed between structural and false ceilings spaced apart from each other by supporting members, the structural and false ceilings separated by a volumetric space height, a method of mounting in the volumetric space a fire-rated container apparatus to forestall false ceiling collapse, to maintain a ceiling fire rating, or both, during a fire, comprising:

providing in the false ceiling a false ceiling hole for access to the volumetric space;

attaching an annular ceiling member to the false ceiling, the annular ceiling member including an opening that upon attachment is positioned relative to the false ceiling hole to provide access to the volumetric space;

forming an operative structural connection between the annular ceiling member and the structural ceiling;

inserting into the false ceiling hole and setting in the volumetric space a container housing that includes structural ceiling and open lower end portions, the container housing having an outer surface and a length that exceeds the volumetric space height so that the lower end portion protrudes outwardly from the false ceiling;

providing a spacing collar of a size that surrounds the lower end portion and covers the outer surface that protrudes outwardly from the false ceiling when the container housing is set in the volumetric space; and forming operative structural connections of the container housing and the spacing collar to the annular ceiling member to secure the container apparatus in place.

18. The method of claim 17, in which the forming of operative structural connections includes attaching the container housing to the spacing collar and attaching the spacing collar to the annular ceiling member.

19. The method of claim 17 further comprising covering with a thermal insulation blanket a sufficient amount of surface area of the structural ceiling portion of the housing to contribute to maintaining a ceiling fire-rating during a fire period.

20. The method of claim 17 further comprising structurally coupling a cover piece to the lower end portion to cover it.

21. The method of claim 17 in which the false ceiling includes interior and exterior surfaces of which the interior surface is nearer to the structural ceiling, and in which the attaching the annular ceiling member includes attaching it to the interior surface of the false ceiling.

22. The method of claim 21 in which the annular ceiling member includes a flat ring.

23. The method of claim 17 in which the forming operative structural connections includes attaching the spacing collar to multiple spacers that are angularly spaced-apart around and downwardly depending from the annular ceiling member.

\* \* \* \* \*